United States Patent [19]

Wagner et al.

[11] 4,416,020
[45] Nov. 15, 1983

[54] SIZE SENSING X-RAY CASSETTE TRAY FOR X-RAY EQUIPMENT

[75] Inventors: James C. Wagner, Ft. Thomas; James E. Barnard, Sparta, both of Ky.; Robert J. Woerner, Cincinnati, Ohio

[73] Assignee: Material Control, Inc., Aurora, Ill.

[21] Appl. No.: 318,086

[22] Filed: Nov. 4, 1981

[51] Int. Cl.³ ............................................. G03B 41/16
[52] U.S. Cl. .................................... 378/181; 378/177
[58] Field of Search ................ 378/181, 177, 179, 180

[56] References Cited

U.S. PATENT DOCUMENTS

| | | | |
|---|---|---|---|
| 3,764,808 | 10/1973 | Lackey | 378/181 |
| 3,829,698 | 8/1974 | Goetz | 378/181 |
| 3,986,034 | 10/1976 | Wittkopp | 378/181 |

Primary Examiner—Craig E. Church
Attorney, Agent, or Firm—Cullen, Sloman, Cantor, Grauer, Scott & Rutherford

[57] ABSTRACT

A size sensing X-ray cassette tray adapted for nesting within an X-ray table or a vertical holder, has a pair of longitudinally spaced opposed front and rear cassette engaging clamps linked together for movement in unison and slidably mounted upon the tray for centering and holding a cassette. A side sensing finger is slidably mounted upon the tray for movement at right angles to the clamp movements. A pair of right angularly related linear potentiometers are mounted upon the tray adjacent one of the clamps and finger, parallel to their direction of movements respectively. Wiper arms are connected to one clamp and finger have contacts slidably engageable with the respective potentiometer for establishing resistances in a circuit with the X-ray equipment proportional to the length and width of the cassette.

22 Claims, 20 Drawing Figures

SIZE SENSING X-RAY CASSETTE TRAY FOR X-RAY EQUIPMENT

BACKGROUND OF THE INVENTION

The invention relates to a size sensing X-ray cassette tray for X-ray equipment adated for automatically controlling a conventional collimator for adjusting the size of a X-ray beam in response to the size of the cassette upon the cassette tray. Prior art example devices for adjusting the size of an X-ray beam are disclosed in one or more of the following United States and British patents:

2,912,202, Petrick   3,206,604, Burehell
4,048,700, Koerner et al   3,502,878, Steward et al
3,091,696, Peyser   3,518,434, Lombardu
3,099,747, Thomas et al   3,518,435, Kok
3,130,313, Tilling   3,581,094, Peyser et al
3,150,263, Callin   3,764,808, Lackey et al
British Patent 1,170,303 (1969).

SUMMARY OF THE INVENTION

It is an important feature of the present invention to provide a size sensing X-ray cassette tray for X-ray equipment for sensing length and width of a cassette for a plurality of different sizes and providing an automatic control for a device for regulating the corresponding dimensions of an X-ray beam.

An important feature is to provide in conjunction with dimension sensing members upon the cassette tray, a pair of right angularly related linear potentiometers adjacent and parallel to the corresponding clamps and a width sensing fingers upon which are mounted wiping contacts for corresponding registry with the potentiometers.

A further feature is to provide linear potentiometers for automatically establishing an electrical potential which is directly related to the length and width of the film or cassette and for providing an automatic control in the electric circuit of the X-ray equipment.

An important feature is to further provide an electrical connection and guide mechanism whereby the contacts from the leads to the potentiometers and to the no cassette limit switch are automatically connected to corresponding contacts forming a part of the X-ray equipment when the cassette tray mounted within a Bucky housing is fully assembled and inserted within an X-ray table or vertical support.

Another important feature is the provision and use of a tray latch which automatically engages and further retains the tray from withdrawal from the Bucky housing until the finger operated latch element is disengaged.

A further important feature is a location of the tray latch to one side of the tray wherein there is provided a finger opening in the bottom cover therefor for manual access to the latch for disengaging the latch from the Bucky housing to permit withdrawal of the cassette tray therefrom.

Another feature is the provision of a front lock assembly in conjunction with one of a pair of interconnected cassette length sensing clamps for securing the clamps position and to facilitate manual unlocking of the clamps with respect to the tray.

Another feature is to provide a side sensing finger slidably mounted upon the cassette tray for movement in a direction at right angles to the movement of the front and rear cassette engaging clamps where in the absence of a cassette from the cassette tray, the side sensing finger is in such an extended position as to cause activation of the no cassette limit switch for preventing energization of the X-ray generator or other logic functions.

A further feature is to provide a pair of normally retracted oppositely arranged side support fingers upon the cassette tray adapted for movement in a direction at right angles to the direction of movements of the front and rear cassette engaging clamps and adapted for supporting the cassette in the cassette tray and in the Bucky housing within which it is positioned when mounted in a vertical position within a vertical support.

A further feature includes the provision of a manually releasable locking means for retaining the side support fingers when adjusted to facilitate sliding movements thereof.

A further important feature is the use of elongated linear potentiometers parallel to the respective movements of the length, and width sensing clamps and fingers so as to provide direct linear measurements upon the potentiometers in an electrical circuit wherein the voltages in the circuit are proportioned to the length and width of the cassette respectively.

A further feature incorporates an improved crank and linkage connection between the front and rear cassette engaging clamps by which the clamps are adapted for movement in unison towards and away from each other.

These and other features and objects will be seen from the following specification and claims in conjunction with the appended drawings.

It will be understood that the drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
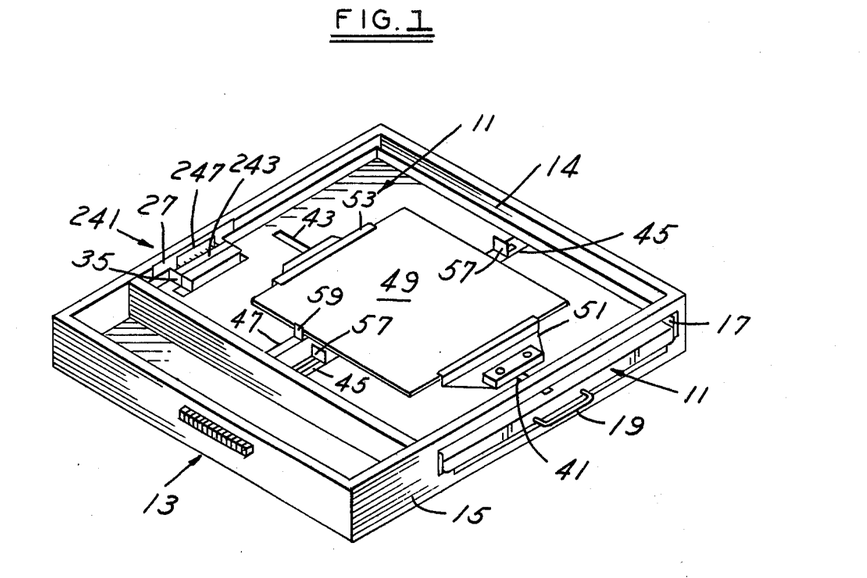
FIG. 1 is a front perspective view of a Bucky housing within which has been nested and inserted the present size sensing X-ray cassette tray for an X-ray apparatus.

Referring to the drawings, FIG. 1, there is designated at 11, the present size sensing cassette tray for X-ray equipment which has been slidably positioned within chamber 14 of the Bucky housing 13. The housing has a front wall 15 with a longitudinal slot 17 therein, rear wall, side walls and a bottom wall upon which the present size sensing cassette tray 11 is positioned utilizing handle 19 connected to the tray.

Though not shown in the drawing, X-ray equipment includes a conventional collimator such as is used in conjunction with X-ray equipment including devices for providing a beam and a conventional generator all of which equipment is omitted from the present disclosure, but is shown in one or more of the references made of record.

The means for adjusting the size of the X-ray beam produced by an X-ray tube has been heretofore controlled in various ways such as shown in the prior art patents of record. The present invention represents a size sensing cassette tray for X-ray equipment which may be used for controlling such collimator.

By known methods, such collimators under the control of a size sensing device such as is disclosed herein is adapted for adjusting the size of the X-ray beam as to its length and width. Thus the size of the X-ray beam is automatically adjusted proportionally to the width and length of the cassette mounted upon the cassette tray.

The present invention is primarily directed to a size sensing cassette tray for X-ray equipment hereafter described in further detail and generally indicated at 11, in FIG. 1.

The present size sensing X-ray cassette tray 11 has been projected through the slot 17 of the conventional Bucky holder 13 to a proper position and retained therein and the loaded Bucky is nested within a horizontal X-ray table or within a vertical holder so that the cassette 49 is supportably mounted upon the tray in the path of the X-rays delivered by conventional X-ray equipment.

In the present disclosure there is provided first and second right angularly related linear potentiometers used in conjunction with devices for measuring the length and width of the cassette and wherein the present clamps and sensing finger are directly connected to slide contacts which move along the surface of the corresponding potentiometers, wherein voltages are established in the electrical circuit which is proportional to the length and width of the cassette 49.

Figure 10:
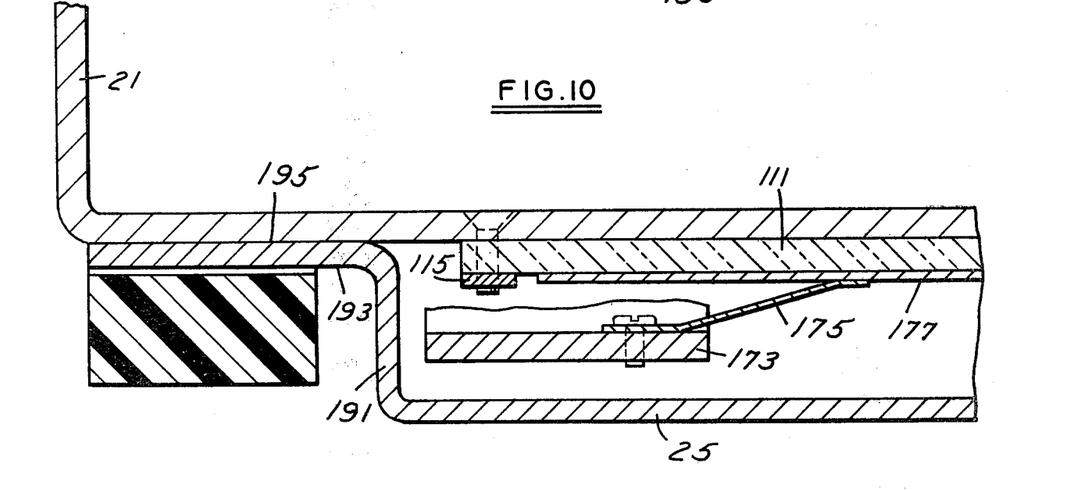
FIG. 10 is a fragmentary section taken in the direction of arrows 10—10 of FIG. 8.

The present size sensing cassette tray 11 has upturned side flanges 21 and a back flange 23. Spaced below the tray is a bottom cover 25 enclosing the linkage and mechanism upon the undersurface of the cover as in FIG. 3. The cover terminates in peripheral upturned flange 191, FIG. 10 and the outurned peripheral flange 193, suitably secured to the tray as at 195.

Figure 2:
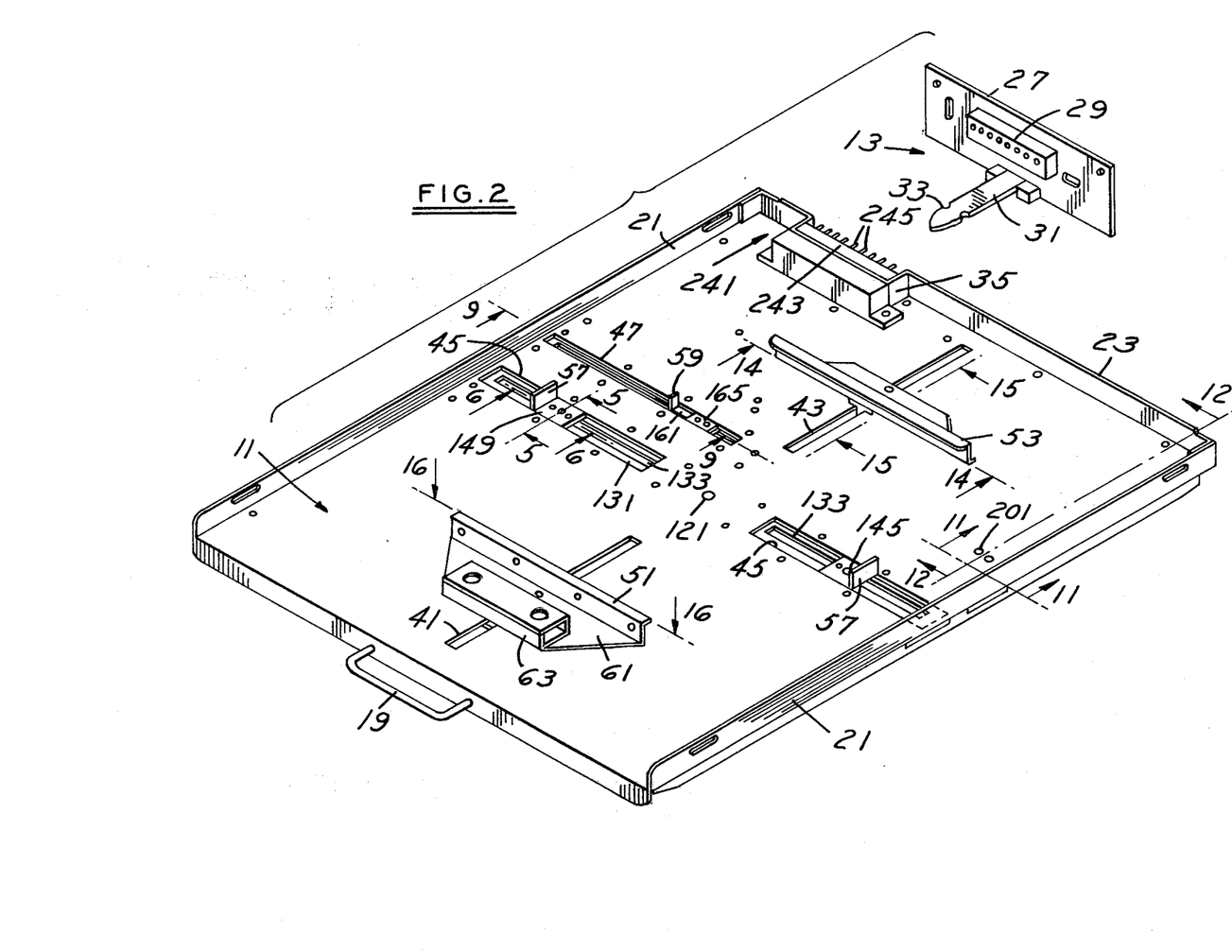
FIG. 2 is a perspective view of the size sensing X-ray cassette tray on a increased scale.
Figure 7:
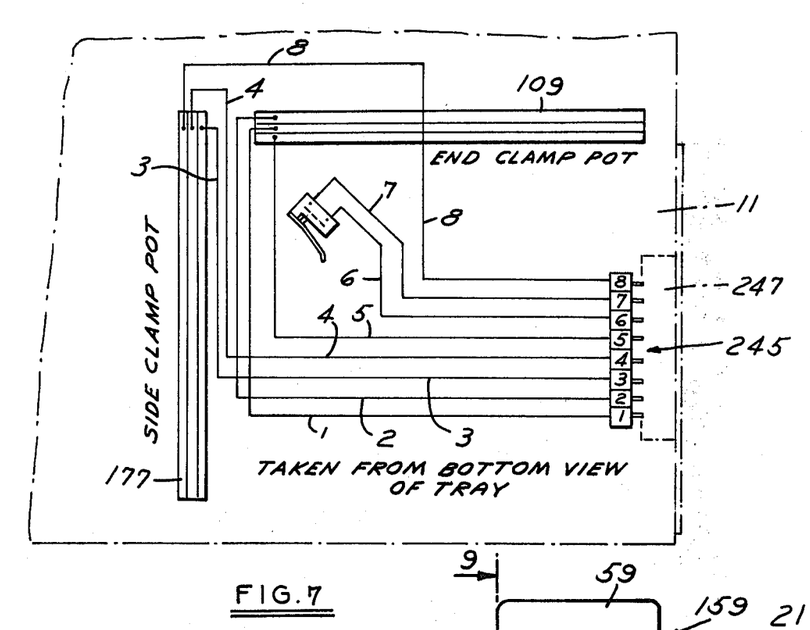
FIG. 7 is a schematic view of the potentiometer and limit switch electrical circuit therefor corresponding to FIG. 3.

As shown in FIG. 2, at the rear of the tray 11 and secured to the interior of the rear wall of the Bucky 13 is an upright mount plate 27 with contact landing pad 29 secured thereto for registry with a series of connections to the collimator, not shown, whereby the series of contacts 245, numbered 1 through 8 as in FIG. 7 may be brought into registry with the collimator at the time that the cassette tray 11, has been projected into the Bucky housing 13.

Figure 3:
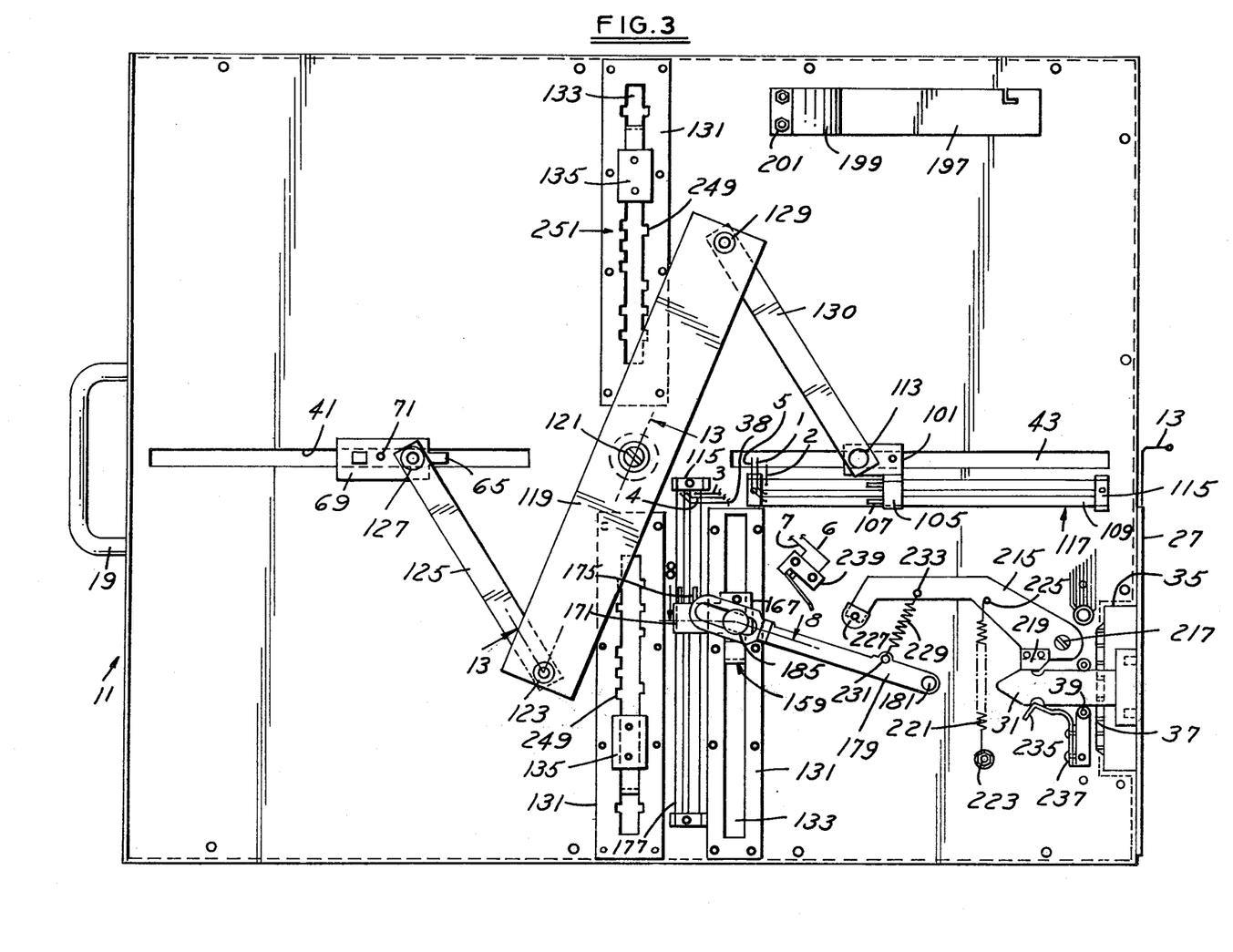
FIG. 3 is a bottom plan view of the cassette tray shown in FIG. 2.

Guide pin or blade 31 is secured to and projects forwardly of mounting plate 27, is notched as at 33 adjacent its outer end and is further shown in FIG. 3. Upon an insertion and assembly of the cassette tray 11 within the Bucky 13, the guide blade 31 is guidably projected through a pair of upright spaced guide posts 39. When the size sensing cassette tray and Bucky 13 have been fully assembled the guide blade 31 takes a relative position shown in FIG. 3 assuring that the cassette tray is properly positioned within the Bucky so that the respective contacts 245 thereon will be in proper registry with the stationary corresponding contact landing pad 29 on mount plate 27.

Tray 11, as shown in FIG. 2, has a pair of centrally arranged aligned longitudinally spaced slots 41 and 43, and at right angles thereto intermediate the length of the tray a pair of longitudinally spaced aligned slots 45 equidistant from the central point 121, FIG. 2, and an additional transverse slot 47 parallel to one of the slots 45.

The present X-ray cassette 49 is mounted upon the size sensing cassette tray 11 and includes film, paper, a plate or similar sensitive material and is normally of a predetermined width and length such as 5 by 7 inches, 8 by 10 inches, 10 by 12 inches, 14 by 17 inches, for illustration.

A pair of spaced opposed front and rear cassette engaging clamps 51 and 53, each including a pair of oppositely arranged bumper pads 55, are slidably mounted upon tray 11 with respect to the slots 41 and 43.

A pair of laterally spaced opposed side support fingers 57 normally retracted when not in use, are slidably mounted within the opposed transverse right angularly related slots 45 shown in FIG. 2. The side support fingers are normally used for centering and supporting the cassette tray only when the tray and its Bucky have been positioned within an upright support for X-ray purposes.

A width sensing finger 59 is slidably mounted with respect to the transverse slot 47 in the tray 11 and is adapted to engage one of the sides of the cassette 49 after the tray has been inserted in the Bucky 13.

FRONT CLAMP 51, FIGS. 16 THROUGH 19

Front clamp 51 includes bottom plate 61, upright end plate 63 and is mounted, supported and secured to a plastic slide 65, of T-shape in cross-section, and in the illustrative embodiment is made of Delrin. Slide 65 includes top plate 67, FIG. 17 which overlies the tray 11, and a bottom plate 69 which underlies the tray with the plates secured together by fasteners 71, FIG. 16.

Figure 19:
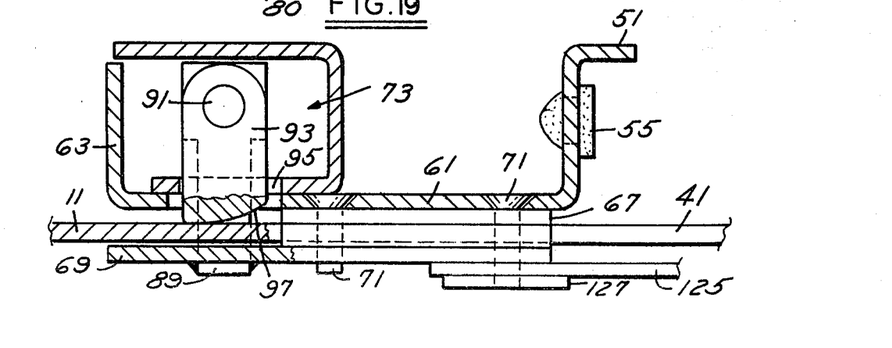
FIG. 19 is a fragmentary section taken in the direction of arrows 19—19 of FIG. 17.
Figure 20:
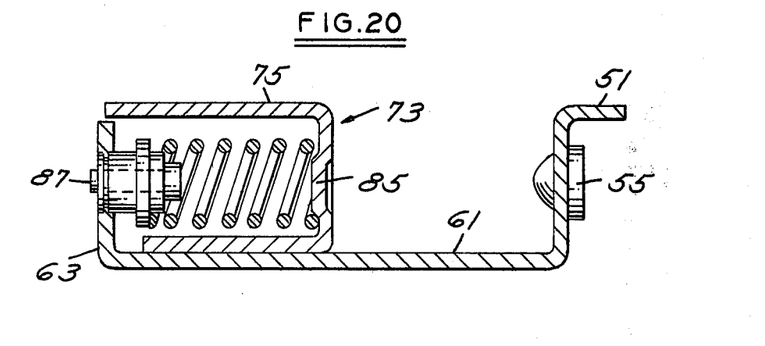
FIG. 20 is a fragmentary section taken in the direction of arrows 20—20 of FIG. 17.

Front clamp 51 includes cam lock 73, FIG. 19, having a trip handle 75 of recumbent U-shape which movably bears upon clamp plate 61. The trip handle has a base 77 which bears upon clamp plate 61, and a pair of spaced elongated slots 79, FIGS. 16 and 18. Upright threaded bosses 80, FIG. 18, project from plate 61 through the elongated slots 79. Fasteners 81 with corresponding washers overlie the base 77 of the trip handle 75 whereby the trip handle is slidably mounted for limited longitudinal movements upon bottom plate 61.

Figure 16:
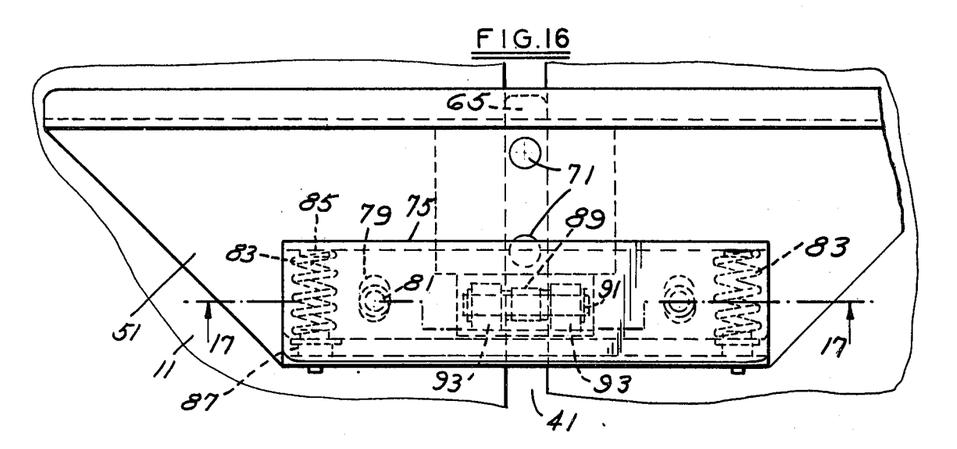
FIG. 16 is a fragmentary section taken in the direction of arrows 16—16 of FIG. 2 on an increased scale.

A pair of laterally spaced tension springs 83 normally bias trip handle 75 away from end plate 63, with the one ends of the springs mounted upon the interior bosses 85, FIG. 16 upon an inner upright wall of the trip handle 75. The opposite ends of the springs are received within the combination tension adjusting bolt and boss assembly 87 mounted upon end plate 63. The tension adjusting bolt 87 on rotation can determine the amount of tension within the corresponding springs 83.

Figure 17:
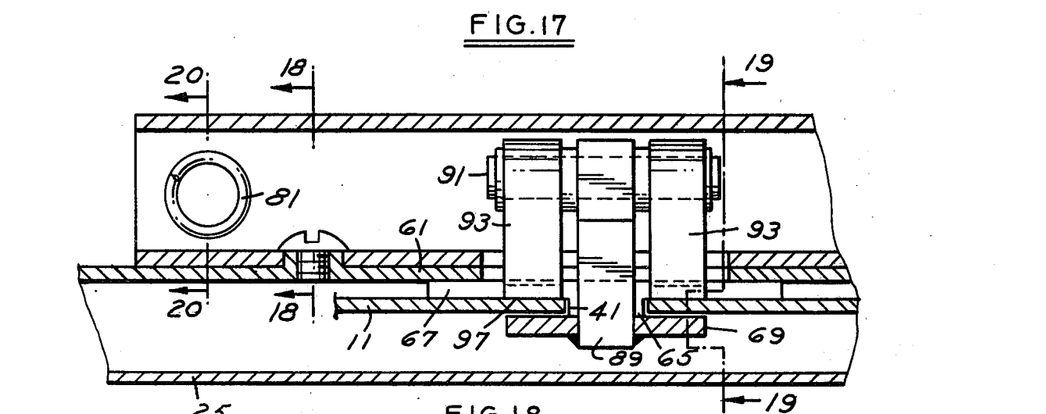
FIG. 17 is a fragmentary section taken in the direction of arrows 17—17 of FIG. 16.
Figure 18:
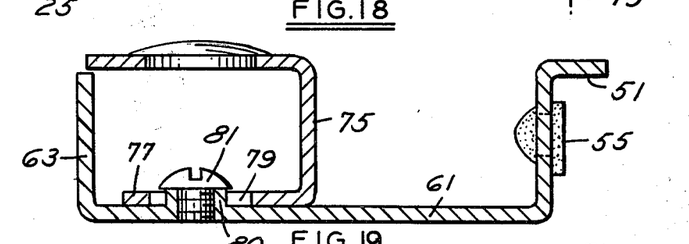
FIG. 18 is a fragmentary section taken in the direction of arrows 18—18 of FIG. 17.

Upright post 89 extends through bottom plate 69 and is secured thereto as by welding, extends upwardly through tray slot 41, through top plate 67, and at its upper end mounts the transverse pivot pin 91. A pair of laterally spaced cam locks 93 are pivotally mounted upon pin 91, extend through corresponding slots 95 in the base of the trip handle 75, through bottom plate 61 and terminate in cam surfaces 97. The cam surfaces are adapted for operative retaining registry with tray 11 as shown in FIGS. 17 and 19. This will secure the longitudinally adjustable front clamp 51 in a preselected adjusted position relative to slot 41 and with respect to the cassette 49 shown in FIG. 1.

In order to release the front clamp 51 to permit its retraction trip handle 75 is grasped by the hand and squeezed with respect to plate 63 causing the cam locks 93 to tilt so as to move out of engagement with tray 11.

For forward movement, trip handle 75 may be grasped by the hand and squeezed with respect to plate 63 causing the cam locks 93 to tilt so as to move out of engagement with tray 11. Alternatively, pushing on plate 63 alone will allow forward movement by causing the cam locks 93 to tilt so as to move out of engagement with tray 11.

Figure 14:
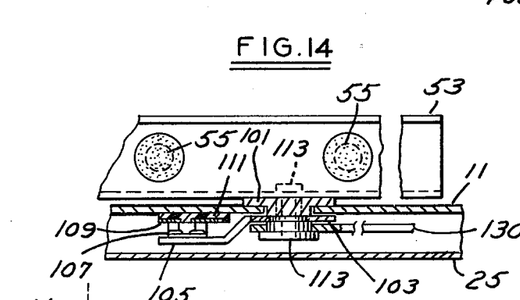
FIG. 14 is a fragmentary section taken in the direction of arrows 14—14 of FIG. 2, on an increased scale.
Figure 15:
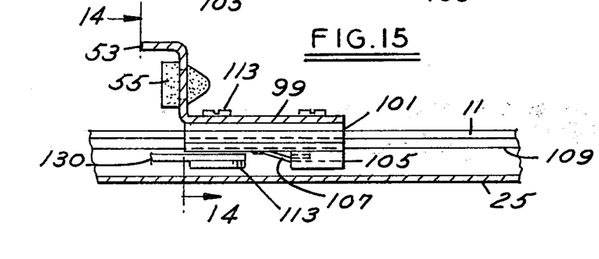
FIG. 15 is a fragmentary section taken in the direction of arrows 15—15 of FIG. 2, on an increased scale.

REAR END CLAMP 53, FIGS. 14 and 15

The rear cassette engaging clamp 53, FIG. 2 is further shown in detail in FIGS. 14 and 15 and includes a pair of laterally spaced cassette engaging rubber bumpers 55, FIG. 14 and connected thereto a top plate 99 mounted upon slide 101 of T-shape in cross-section slidably and adjustably positioned within guide slot 43. The slide includes the bottom plate 103 which bears against the undersurface of tray 11. The assembly including top plate 99, slide 101 and bottom plate 103 are secured together by the fasteners 113.

A transverse wiper arm 105 extends from plate 103 and at one end mounts a pair of spaced wipers or contacts 107 in sliding engagement with the first potentiometer strip 109. The strip 15 anchored to the undersurface of the tray by a pair of saddle clamps or fasteners 115, FIG. 3. The respective leads 1, 2 and 5 extend from potentiometer 109 and are connected to the corresponding connectors 1, 2 and 5 in the electrical circuit shown in FIG. 7.

The combination wiper arm 105, the wipers 107 and the corresponding potentiometer 109 generally indicated at 117 function as the length sensing mechanism for the cassette 49. The front and rear cassette engaging clamps 51 and 53 cooperate with and form a part of the cassette length sensing mechanism 117 being slidably mounted upon the tray 11 longitudinally thereof and are adapted for centering and holding the cassette 49 such as shown in FIG. 1.

The respective front and rear clamps 51 and 53 are interconnected by a suitable link means, FIG. 3, whereby the clamps are adapted for movement in unison towards and away from each other.

Figure 13:
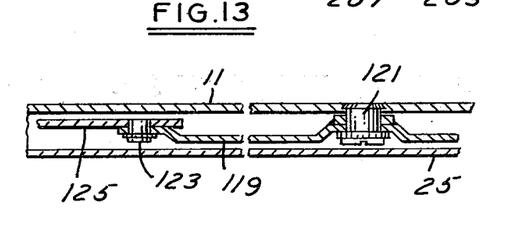
FIG. 13 is a fragmentary section taken in the direction of arrows 13—13 of FIG. 3.

This link means includes as shown in FIGS. 3 and 13, elongated crank 119 pivotally mounted at 121 upon the undersurface of tray 11, and at one end pivotally connected at 123 to the link 125. The link at its other end is pivotally connected to the front clamp assembly 51 as by the headed pivot fastener 127. The fastener, as shown in FIG. 19, extends through link 125, fragmentarily shown, up through bottom plate 69, top plate 67 and into the clamp plate 61 for securing the assembled parts together with respect to the link 125.

A second link 130 at one end is pivotally connected at 129 to the other end of the crank 119, and at its opposite end is pivotally connected by the fastener 113 to the slide 101 which mounts the rear cassette engaging clamp 53.

By this construction, longitudinal movement of the front end clamp 51 with respect to slot 41 effects a corresponding movement of the slide 101 with respect to slot 43 so that the front and rear clamps move in unison towards or away from each other by the linkage assembly shown in FIG. 3.

SIDE SUPPORT FINGER 57, FIGS. 2 THROUGH 6

The side support fingers 57 are slidably mounted within the opposed aligned transverse slots 45 and are normally retracted to a non-use position when the size sensing cassette tray 11 is used in a horizontal position, such as shown in FIG. 1. The side support fingers 57 are used when the tray 11 is used in an upright position within the Bucky housing 13 when it is slidably mounted upon a vertical holder normally upon a wall or other support.

Before the cassette 49 has been clamped by the front and rear clamps 51 and 53, the side support finger 57 is slid along the slot 45 into position to support cassette 49. With respect to each of the slots 45, there is provided upon the undersurface of the tray 11, the elongated guide plate 131, FIG. 3, having a longitudinal slot 133 in registry with slot 45 inwardly thereof, with the plate providing a support for the elongated plastic slide 135 preferably constructed of Delrin and T-shape in cross-section. The slide construction is shown in detail in FIGS. 4, 5 and 6. The slide includes the upstanding guide flange 137 of reduced width which is movably positioned within slot 133, and has formed therein a transverse push button slot 139, FIG. 4, and has an upright guide pin 141 as a part thereof.

Figures 4, 5, 6:
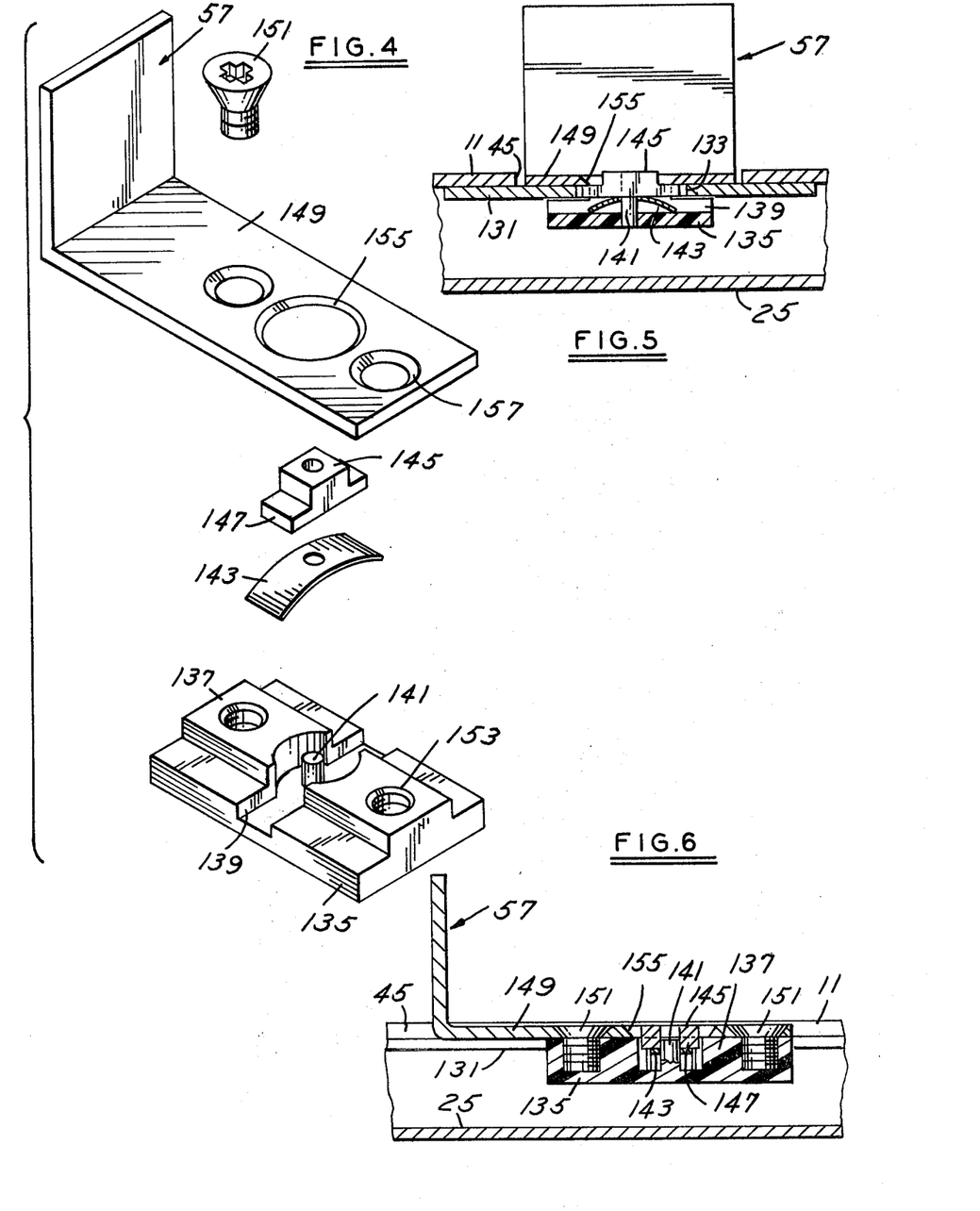
FIG. 4 is an exploded view of one of the side support fingers and associated slide and release button as shown in FIG. 2.
FIG. 5 is a section taken in the direction of arrows 5—5 of FIG. 2, on an increased scale.
FIG. 6 is a fragmentary section taken in the direction of arrows 6—6 of FIG. 2, on an increased scale.

Slide 135 bears against the undersurface of the tray 11 and flange 137 is guidably positioned within the slot 133. The arcuate leaf spring 143 is centrally apertured and positioned over guide pin 141 and the apertured push button 45 with transverse base 147 is mounted over the spring and nested within the transverse slide slot 139.

Finger plate 149 at right angles to and forming a part of the side support finger 57 is positioned in slot 45 and overlies plate 131. The parts are secured together by fasteners 151, FIG. 4, which extend through apertures 157 in finger plate 149 and into the threaded apertures 153 forming a part of slide 135. A push button 145 projects up through aperture 155 within finger plate 149. With the parts assembled as shown in FIG. 5, tension in the leaf spring 143 is sufficient to hold push button 145 in a selected detent 249 on plate 131. In order to release the engagement between the slide and plate 131, the push button 145 is depressed sufficiently so that support finger 57 may be laterally adjusted to register with a newly selected detent or notch 249. This is used when the cassette is employed in an upright position within a Bucky housing 13 which is in an upright position and to be used with respect to a vertical support forming a part of the X-ray equipment.

WIDTH SENSING MECHANISM

The present width sensing mechanism generally indicated at 159, FIG. 3, includes a side size sensing finger 59 having a base 161. Base 161 is slidably positioned within slot 47 and has a vertically displaced end portion or bottom plate 167. Slide 165 of T-shape is guidably positioned within slot 47 and the assembly of the plates from the slide 165 is secured together by fasteners 169, 185.

Slide bottom plate 167, as shown in FIG. 3, has connected thereto the transverse wiper arm 171 which mounts contacts 175 and which is secured to the slide assembly as by the headed nut 185. The headed nut 185 extends through slotted end 183 of the contact arm 179, through the spacer 189 and bottom plate 167 and is secured to slide 165 by fastener 169.

Figure 8:
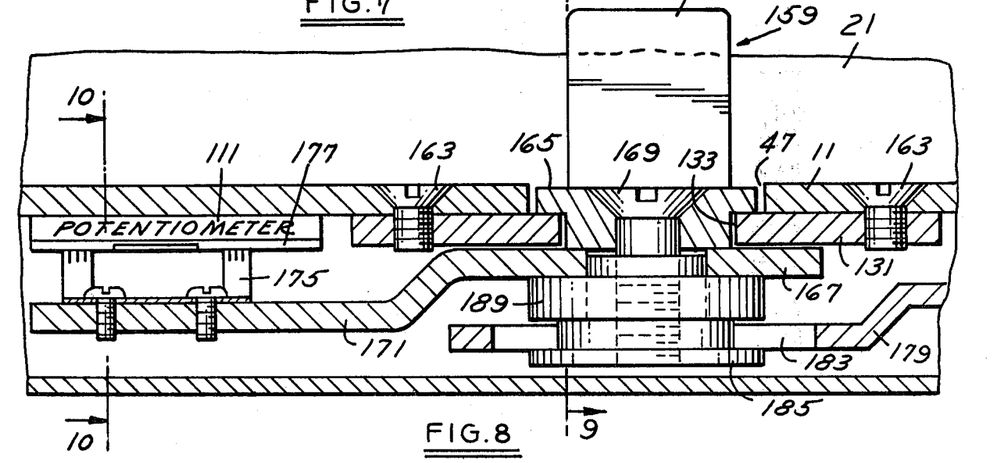
FIG. 8 is a fragmentary section taken in the direction of arrows 8—8 of FIG. 3, on an increased scale.

The contacts 175, FIG. 8, underlie and are in operative engagement with the undersurface of elongated second potentiometer 177 suitably secured to the undersurface of the tray as by fasteners 115, FIG. 3. Leading from the second potentiometer 177 are the lead wires 3, 8 and 4, which as shown in the wiring diagram, FIG. 7, connected to the corresponding contacts 3, 8 and 4 of the connector assembly 245 mounted upon the rear portion of the cassette tray, FIG. 2.

The contacts 175. FIG. 8, underlie and are in operative engagement with the undersurface of elongated second potentiometer 177 suitably secured to the undersurface of the tray as by fasteners 115, FIG. 3. Leading from the second potentiometer 177 are the lead wires 3, 8 and 4, which as shown in the wiring diagram, FIG. 7, connected to the corresponding contacts 3, 8 and 4 of the connector assembly 245 mounted upon the rear portion of the cassette tray, FIG. 2.

The side sensor contact arms 179, upon absence of a cassette, is adapted to engage the normally closed limit switch 239 upon the undersurface of tray 11. Said switch which is arranged in a circuit including the leads 6 and 7 are connected to contacts 6 and 7 on the electric panel circuit shown in FIG. 7. Under a condition when no cassette is in place, the side sensor finger 159 will be biased inwardly so that the contact arm 179 pivoted at 181 upon the undersurface of the tray will come in contact with the normally closed limit switch 239. Opening of the switch will block the flow of electrical power to the generator for the X-ray tube. This means that under such condition of no cassette within the tray, the X-ray generator known in the art will remain deactivated and there will be no exposure or X-ray directed onto the patient to be X-rayed.

Figure 9:
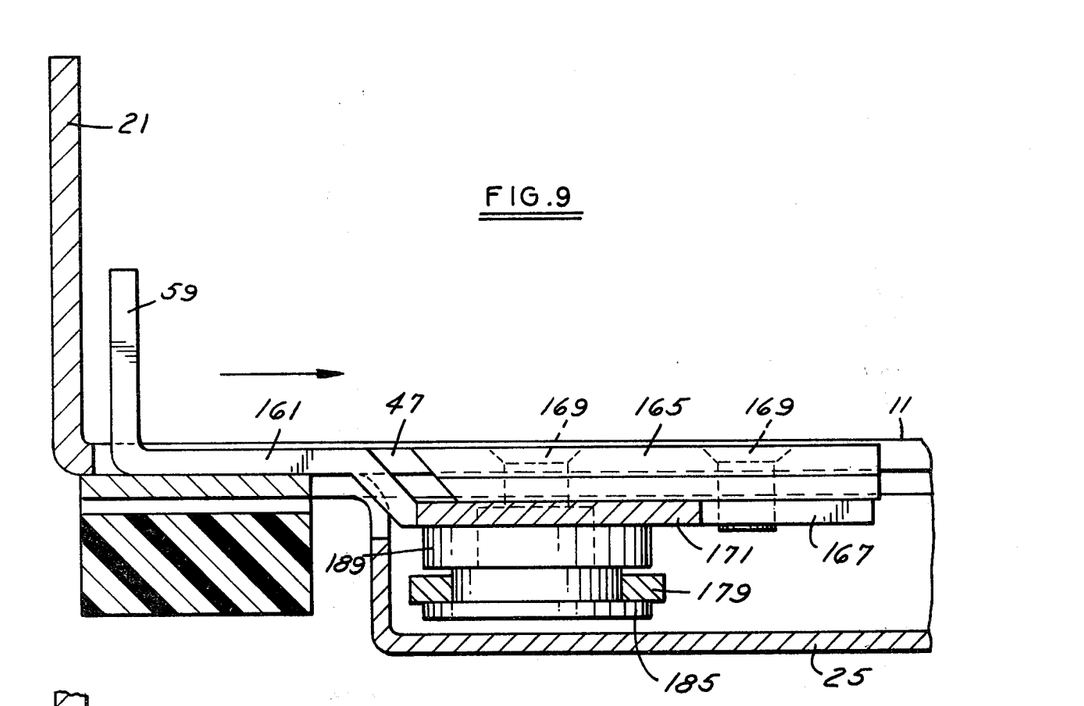
FIG. 9 is a fragmentary section taken in the direction of arrows 9—9 of FIGS. 2 and 8.

Elongated contact arm 179, shown in FIGS. 3, 8 and 9 has an elongated slot 183 at one end and receives the headed nut 185. The slotted end of the contact arm 189 is loosely, with a lost motion connection, joined with the transversely reciprocal slide 171 for the side sensing finger 59.

TRAY LATCH

Figure 11:
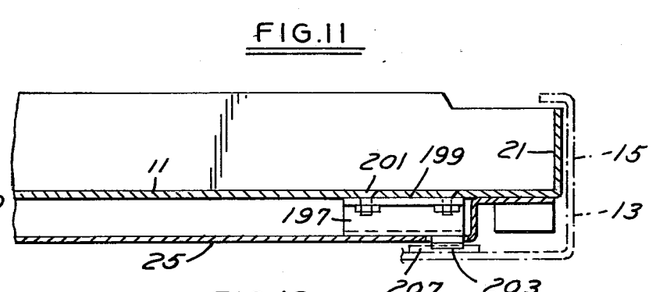
FIG. 11 is a fragmentary section taken in the direction of arrows 11—11 of FIG. 2, on a increased scale.
Figure 12:
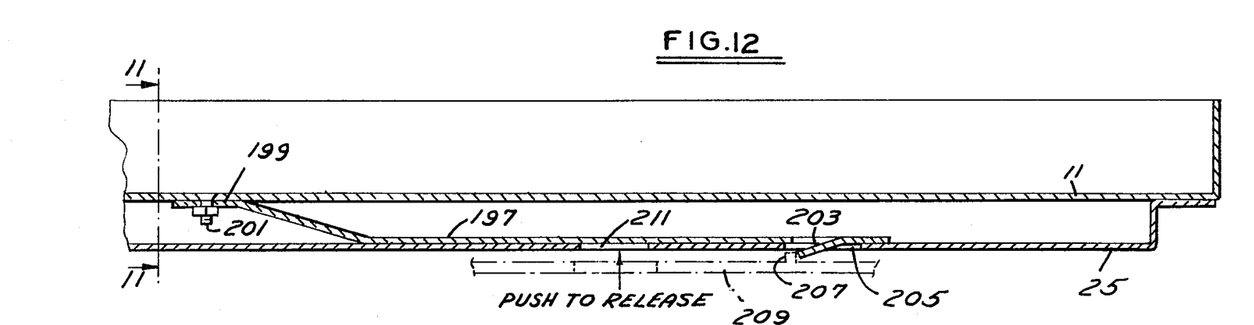
FIG. 12 is a fragmentary section taken in the direction of arrows 12—12 of FIG. 2, on an increased scale.

There is mounted upon the undersurface of the tray 11, flexible tray latch assembly 197, shown in FIGS. 3, 11 and 12. The flexible tray latch has at one end a mount flange 199 which bears against the undersurface of tray 11 and is secured thereto by fasteners 201. The resilient tray latch 197 is included angularly downward from tray 11 and terminates in a portion which is supported upon and extends along bottom cover 25, FIG. 12. The tray latch 197 is arranged adjacent one side of the tray 11 and extends rearwardly thereof.

The tray latch at one end terminates in the downwardly and forwardly inclined struck out latch member 203, FIG. 12, which extends through an aperture 205 in bottom cover 25 when the tray is fully inserted within the Bucky 13. It takes a position so as to move over and retainingly engage stop 207 projecting from bottom plate 209 of the Bucky housing. Thus, when the size sensing X-ray cassette tray 11 is inserted within the Bucky to the correct position, the latch member 203 will snap into position behind the stop 207 for retaining the tray within the Bucky holder against rearward displacement. The tray is slidably mounted upon the bottom wall of the Bucky and is guided into the correct positioning by the guide pin or blade 31, shown in FIG. 3.

Bottom cover 25 has a secondary finger aperture 211 which underlies the flexible latch 197, whereby on manual application of a finger through the aperture 211 the latch 197 may be manually elevated sufficiently to disengage the latch member 203, the stop 207.

CRANK ARM

Referring to FIG. 3, being a bottom plan view of the tray, the crank arm 215 is pivotally mounted at one end at 217 to the tray and spaced from by the adjacent pivot mounting is a plastic nosepiece 219, preferably made of Delrin. Tension spring 221 at one end is anchored to the tray at 223 and at its other end is anchored as at 225 to crank arm 215 intermediate its ends.

The crank arm intermediate its ends is also connected at 233 to the tension spring 229 which is anchored at its other end to contact arm 179 as at 231. Spring detent 237 is secured to the tray adjacent the guide post 39 and its free end 235 is adapted for yieldably registry within notch 33 in the outer end of guide blade 31.

Striker 227 on the free end of crank arm 215 is preferably constructed of Delrin. With the tray 11 withdrawn from the Bucky and out of engagement with guide blade 31, under the action of spring 221 would normally be in a position transversely of guide blade 31, and in registry with contact arm 179 due to the action of the springs 221 and 229. However, when the tray is inserted within the Bucky and the guide pin 31 is projected between the posts 39 the guide pin operatively engages the nosepiece 219 of crank arm 215, and the crank arm is rotated to the position shown in FIG. 3 against the action of spring 221 and increasing the tension on spring 229.

In the event that no cassette is present within the tray between the respective front and rear clamps, there is nothing to hold the side sensing finger 59 with the result that spring 229 is effective to bias the contact arm into engagement with the limit switch 239. This opens the circuit so that there is no power to the X-ray generator and there is no waste of energy or exposure thereof to a human person being X-rayed. Therefore, in the absense of a cassette or X-ray film, the action of the contact arm 179 engaging the limit switch 239 prevents accidental X-ray exposure.

As shown in FIGS. 3 and 7, the normally closed limit switch 239 terminates in a pair of leads 6 and 7 which extend to the corresponding contacts 6 and 7 shown in the FIG. 7. FIG. 7 illustrates all of the leads 1 through 8 from the corresponding potentiometers 109 and 177 including the leads from the limit switch 239.

Each of these leads terminate in the series of contacts 1 through 8 adapted for respective registry with corresponding contacts not shown, of the X-ray machine. These are individually registerable with each of the contacts 1 through 8, FIG. 7, when the tray is assembled within the Bucky 13.

Each of the respective contacts 1 through 8 are nested within the mount base 243 and supported within mount bracket 35, FIG. 1, and are in registry with contact landing pad 29 on the mounting plate 27 upon the interior wall of Bucky 13.

The respective contacts 1 through 8 projecting rearwardly of the mount base 243, sometimes referred to as a "Pogo Assembly", made an electrical connection with a corresponding series of contact pads mounted on plate 27.

Accordingly, upon proper registry of the cassette tray within the Bucky, and upon proper registry and assembly of the Bucky within the X-ray machine table or vertical holder, electrical contact is made with respective contacts 1 through 8 on the mount base 243 and corresponding to the circuit shown in FIG. 7.

Referring to FIG. 3, each of the guide plates 131 upon the undersurfaced tray 11 has a series of longitudinally spaced notches 249 and associated indicia 241 for visibly indicating the position of the respective slides 135 corresponding to the side support fingers 57, shown in FIG. 2.

Having described my invention, reference should now be had to the following claims:

We claim:

1. A size sensing X-ray cassette tray adapted for selective nesting within horizontal X-ray tables or vertical holders comprising longitudinally spaced opposed front and rear cassette engaging clamps slidably mounted upon said tray longitudinally thereof, for centering and holding a cassette upon said tray;
   link means on said tray interconnecting said clamps for movement in unison towards and away from each other;
   an elongated first linear potentiometer upon said tray adjacent one of said clamps and parallel to its direction of movement, having leads connected into an electrical circuit;
   a wiper arm connected to said one of said clamps having contacts slidably engageable with said first potentiometer;
   a side sensing finger slidably mounted upon said tray for movement at right angles to said clamp movements engageable with one side of said cassette;
   an elongated second linear potentiometer upon said tray adjacent said side sensing finger and parallel to its direction of movement, having leads connected into said electrical circuit;
   and a wiper arm connected to said finger having contacts slidably engageable with said second potentiometer, the positioning of said contacts upon said potentiometers establishing electrical potentials in said circuit proportional to the length and width of said cassette, respectively.

2. In the size sensing cassette tray of claim 1, the mounting of said clamps including a pair of longitudinally spaced aligned first and second slots in said tray;
   a slide guidably mounted in each slot secured to each clamp respectively and retainingly engaging said tray;
   the mounting of said finger including an elongated third slot in said tray at right angles to said first and second slots;
   and a slide guidably mounted in said third slot secured to said finger and retainingly engaging said tray.

3. In the size sensing cassette tray of claim 1, said link means including a crank arm intermediate its ends pivotally mounted upon said tray intermediate said clamps;
   and a pair of links at their one ends pivotally connected to opposite ends of said crank arm, and at their other ends connected to said clamps respectively.

4. In the size sensing cassette tray of claim 1, a Bucky housing having front, rear, side and bottom walls defining a chamber adapted for insertion and positioning within said X-ray table or vertical holder;
   said cassette tray being removably nested within said chamber;
   and a yieldable latch means upon and depending from said tray.

5. In the size sensing cassette tray of claim 4, said latch means including an elongated resilient latch arm at one end secured to said tray and extending forwardly and downwardly thereof, and at its free end having a depending struck out detent movable over said stop projection, said latch arm being manually displaceable for disengaging said detent from said stop.

6. In the size sensing cassette tray of claim 5, said latch arm being arranged adjacent and along one side of said tray.

7. In the size sensing cassette tray of claim 5, a bottom cover spaced from and secured to said tray having a pair of longitudinally spaced apertures underlying said latch arm, said detent extending through one of said apertures, the other aperture being a finger opening for manually raising said latch arm disengaging said detent to permit withdrawal of said tray from said Bucky housing.

8. In the size sensing cassette tray of claim 7, said latch arm extending along and supported upon said bottom cover.

9. In the size sensing cassette tray of claim 1, a pair of spaced opposed normally retracted side support fingers slidably mounted upon said tray laterally thereof for movements at right angles to said clamp movements retainingly engageable with opposite sides of said cassette for supporting said cassette when said tray is nested upright within said vertical holder.

10. In the size sensing cassette tray of claim 9, the mounting of said side support fingers including a pair of longitudinally spaced aligned fourth and fifth transverse slots in said tray;
    and a slide guidably mounted in said fourth and fifth slots secured to each side support finger respectively and retainingly engaging said tray.

11. In the size sensing tray of claim 10, a manually yieldable detent lock means on said side support fingers slides for securing said slides in adjusted positions upon said tray.

12. In the size sensing cassette tray of claim 10, a pair of spaced transverse elongated plates with longitudinal slots therein mounted upon said tray in registry with said fourth and fifth slots and receiving said side support finger slides;

said plates having formed therein a series of spaced notches adjacent said plate slots along their length;

and indicia on said plates for designating the location of said side support finger slides.

13. In the size sensing cassette tray of claim 11, said lock means including an elongated upright guide flange on each slide for said side support fingers nested in said fourth and fifth slots respectively, there being a transverse slot in each slide;

a push button mounted in said transverse slot;

a leaf spring in said transverse slot between said slide and push button;

each said support finger being apertured and secured to said slide, retainingly engaging said push button under compression a portion of said push button extending through said side support finger manual depression of said push button releasing said slide for lateral adjustments.

14. In the size sensing cassette tray of claim 1, the mounting of said front clamp including an elongated slot within and longitudinally of said tray;

a slide guidably mounted in said slot, secured to said front clamp and retainingly engaging said tray;

cam locking means mounted upon said front clamp in friction securing engagement with said tray;

and a spring biased trip handle movably mounted and retained upon said front clamp, on manual retraction disengaging said cam locking means from said tray to permit longitudinal adjustment of said front clamp upon said tray.

15. In the size sensing cassette tray of claim 14, said cam locking means including an upright post secured to said slide extending through said tray slot and into said trip handle;

a transverse pin upon said post;

and a pair of elongated cam lock members at their one ends pivotally mounted upon said pin, having cam surfaces at their other ends in operative retaining engagement with said tray, manual retraction of said trip handle tilting and releasing said cam lock members.

16. In the size sensing cassette tray of claim 15, said trip handle being of recumbent U-shape overlying said front clamp;

and yieldable spring means interposed in compression between said front clamp and trip handle.

17. In the size sensing cassette tray of claim 1, a normally closed limit switch having leads connected to said circuit in a mode to deactivate said circuit, mounted upon said tray;

and movable means in said tray spaced from and normally biased toward said switch, engageable by a cassette when mounted upon said tray said movable means being adapted to engage said switch to deactivate said circuit only when a cassette is absent.

18. In the cassette tray of claim 17, said movable means including a contact arm at one end pivotally mounted upon said tray and at its other end loosely connected to said side sensing finger;

said side sensing finger being fully extended when a cassette is absent whereby said contact arm engages and opens said limit switch.

19. In the size sensing cassette tray of claim 4, an apertured mounting plate within the Bucky housing upon the interior of its rear wall;

an elongated guide blade having a tapered end extending at right angles and secured to said mounting plate and projecting into the interior of said Bucky housing;

and a pair of laterally spaced posts on said tray guidably receiving said blade when said tray is fully inserted into said Bucky housing.

20. In the size sensing cassette tray of claim 19, said guide blade being notched adjacent its end;

and a yieldable spring detent mounted upon said tray normally in the path of relative movement between said Bucky housing and tray adapted for registry within said blade notch when said tray is fully inserted within said Bucky housing.

21. In the size sensing cassette tray of claim 18, a Bucky housing having front, rear, side and bottom walls defining a chamber adapted for insertion and positioning within said X-ray table or vertical holder;

said cassette tray being removably nested within said chamber;

a mounting plate within said Bucky housing upon the interior of its rear wall;

an elongated guide blade having a tapered end extending at right angles and secured to said mounting plate projecting into the interior of said Bucky housing;

a pair of laterally spaced posts on said tray guidably receiving said blade when said tray is fully inserted into said Bucky housing;

a crank assembly at one end pivotally mounted upon said tray;

spring means normally biasing said crank assembly transversely of said guide blade;

a spring means between said crank assembly and contact arm;

and a striker on the other end of said crank assembly normally engageable with said contact arm whereby on assembly of said tray within said Bucky housing, said blade operatively rotates a crank assembly biasing said contact arm toward said limit switch.

22. In the size sensing cassette tray of claim 17, an electrical connector means at the rear of said tray including a support bracket on said tray;

an elongated insulator mount base nested within said bracket;

a series of parallel spaced laterally aligned assembly contacts projected through said mount base in insulated relation and connected respectively to the respective potentiometer leads in said circuit and the leads to said limit switch;

said contacts adapted for engaging registry with a corresponding series of contacts on said X-ray table or vertical holder for connection to a power source, to a collimator for regulating the dimensions of an X-ray beam and to an X-ray generator respectively.

* * * * *